Aug. 9, 1932.   C. MOTT ET AL   1,871,075
APPARATUS FOR MEASURING THE CONTENTS OF GAS CONTAINERS
Filed July 5, 1928
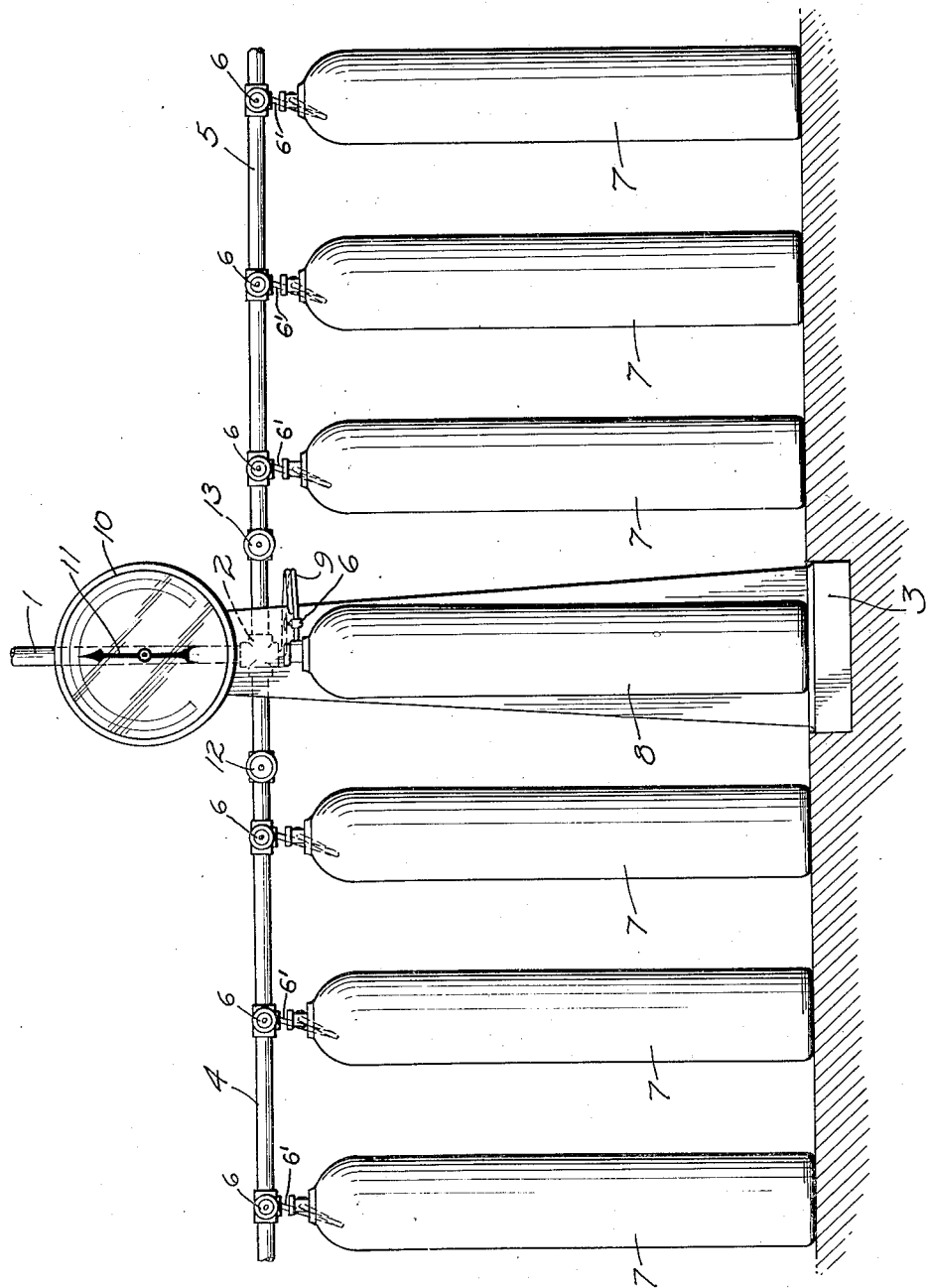
INVENTORS:
Chester Mott,
Gerald G. Spencer,
BY
ATTORNEY.

Patented Aug. 9, 1932

1,871,075

UNITED STATES PATENT OFFICE

CHESTER MOTT AND GERALD G. SPENCER, OF DENVER, COLORADO, ASSIGNORS, BY MESNE ASSIGNMENTS, TO UNION CARBIDE AND CARBON RESEARCH LABORATORIES, INC., A CORPORATION OF NEW YORK

APPARATUS FOR MEASURING THE CONTENTS OF GAS CONTAINERS

Application filed July 5, 1928. Serial No. 290,374.

This invention relates to a method of and apparatus for measuring the contents of gas containers, more particularly oxygen cylinders. It has for its object the provision of means and methods whereby the filling of empty oxygen cylinders to an exact net weight of gas is rendered easy and certain.

Referring to the accompanying drawing, numeral 1 indicates a compressor charging line carrying gas under high pressure. It is threaded into the upper opening of a four-way cross coupling 2, located above a scale 3. The cross coupling 2 has threaded into its opposite side openings two charging manifolds 4 and 5, located on the left and right sides, respectively. Such manifolds are provided with a plurality of connections carrying charging valves 6 having coils 6', to which empty cylinders 7 are attached for filling. A master cylinder 8 is selected at random from the lot of cylinders to be charged and is connected to the lower opening of cross coupling 2 through a horizontally wound coil of flexible pipe or "pigtail" shown at 9, which is provided with a charging valve 6. The master cylinder rests upon the scale platform, which is level with the floor. Above the cross coupling 2 is a scale dial 10, which may be arranged with a rotatable indicator 11, so that the tare weight of the empty master cylinder may be made to be zero on the dial. Valves 12 and 13 are provided in the charging manifolds for isolating both banks of cylinders.

The method of operation is as follows:

The apparatus is connected up as shown with the charging valve 6 of the master cylinder closed, valves 12 and 13 closed and the remaining charging valves 6 open. The scale indicator 11 is now turned so that the tare weight is zero, or the tare weight on an ordinary dial is noted. If the left bank is to be charged the valve 12, and the charging valve 6 on the master cyinder are then opened. Usually one bank at a time is charged. The pigtail connecting the master cylinder is arranged with coils horizontal in order that the pressure of the gas, which tends to unwind the pigtail, can exert no upward pull or downward push on the cylinder. A horizontal push or pull leads to no substantial inaccuracy. A vertically exerted pigtail push or pull can introduce an inaccuracy as great as 3%.

When the master cylinder has reached approximately its intended net weight, the valves 12 and 13, and the master cylinder charging valve 6 are closed. The net weight is then read on the scale dial 10. If greater accuracy is desired, the reading may be taken with the pigtail 9 disconnected. If more gas is necessary to bring the cylinders up to proper weight, the master cylinder is again connected as before and charging continued until the difference in weight has been added. The valves 6 of the cylinders are then closed and the cyinders are disconnected, the master cylinder included.

When it is desired to charge another bank of cylinders, the master cylinder is chosen from one of the next lot. By using a different master cylinder for each charging, we are always sure that the master cylinder is at the same temperature as those to be charged. This is important, since the effect of cold in increasing the density of gases is well known.

We claim as our invention:

1. An apparatus for measuring the contents of gas containers comprising: a manifold; a plurality of charging valves arranged on said manifold; a cross coupling on said manifold; a compressor pipe connected to said coupling; a charging valve connected to said coupling, said valves adapted for attachment to said gas containers; and means for weighing a detachable container connected by means of a horizontally disposed coil to the charging valve connected to said cross coupling.

2. An apparatus for measuring the contents of compressed gas containers comprising: a manifold; a pipe leading from a gas compressor to said manifold; a plurality of valves connecting said containers and said manifold; and means for continuously weighing a detachable container attached by means of a horizontally disposed coil to one of said valves.

3. An apparatus for measuring the contents of compressed gas containers comprising: a manifold formed in sections; a cross coupling connecting said manifold sections; a gas line connected to said coupling; a plurality of charging valves on said manifold, said valves connecting said containers with said manifold; a valve on said coupling; a detachable container connected to said valve by means of a horizontally disposed coil coupling; and means for initially determining the net weight of said last-mentioned container and thereafter determining the net weight of the other of the said containers.

In testimony whereof, we have hereunto set our hands at Denver, Colorado, this 27th day of June, 1928.

CHESTER MOTT,
GERALD G. SPENCER.